(12) United States Patent
Dabir et al.

(10) Patent No.: US 7,219,684 B2
(45) Date of Patent: May 22, 2007

(54) SADDLE TEE AND TOOL FOR IRRIGATION LINES

(75) Inventors: Rajiv Dabir, Pomona, CA (US); Kevin Girard O'Brien, Pasadena, CA (US)

(73) Assignee: Rain Bird Corporation, Azusa, CA (US)

( * ) Notice: Subject to any disclaimer, the term of this patent is extended or adjusted under 35 U.S.C. 154(b) by 359 days.

(21) Appl. No.: 11/046,495

(22) Filed: Jan. 28, 2005

(65) Prior Publication Data
US 2006/0169805 A1    Aug. 3, 2006

(51) Int. Cl.
*F16L 41/12*    (2006.01)

(52) U.S. Cl. .................. 137/318; 285/197; 251/284

(58) Field of Classification Search .............. 137/318; 251/284; 285/197
See application file for complete search history.

(56) References Cited

U.S. PATENT DOCUMENTS

| | | | |
|---|---|---|---|
| 2,281,172 A | 4/1942 | Rodgers | |
| 2,287,354 A | 6/1942 | Misch | |
| 2,344,163 A | 3/1944 | Misch | |
| 2,839,075 A | 6/1958 | Mueller | |
| 3,349,792 A | 10/1967 | Larkin | |
| 3,432,188 A | 3/1969 | Turner | |
| 3,471,176 A | 10/1969 | Gilchrist | |
| 3,489,441 A | 1/1970 | Malcolm | |
| 3,503,407 A | 3/1970 | Nooy | |
| 3,516,426 A | 6/1970 | Toll | |
| 3,756,267 A | 9/1973 | Hutton | |
| 3,762,263 A | 10/1973 | Bocceda | |
| 3,806,031 A | 4/1974 | Olson | |
| 3,849,639 A | 11/1974 | Brock et al. | |
| 3,870,431 A | 3/1975 | Luckenbill et al. | |
| 3,872,880 A * | 3/1975 | Ver Nooy et al. | .......... 251/284 |
| 3,891,247 A | 6/1975 | Smith | |
| 3,920,037 A | 11/1975 | Hoff et al. | |
| 3,976,091 A | 8/1976 | Hutton | |
| 3,999,785 A | 12/1976 | Blakeley | |
| 4,018,464 A | 4/1977 | Acda et al. | |
| 4,063,844 A | 12/1977 | Pessia | |
| 4,076,038 A | 2/1978 | Wynne | |
| 4,239,265 A | 12/1980 | King, Sr. | |
| 4,391,458 A | 7/1983 | Blakeley | |
| 4,522,339 A | 6/1985 | Costa | |
| 4,606,558 A | 8/1986 | Davidson | |

(Continued)

FOREIGN PATENT DOCUMENTS

EP    0 594 361 B1    4/1994

*Primary Examiner*—Kevin Lee
(74) *Attorney, Agent, or Firm*—Fitch, Even, Tabin & Flannery

(57) ABSTRACT

A saddle tee assembly for use with an irrigation line. The saddle tee assembly generally includes a collar portion having a bore therethrough; a strap portion for securing the collar to an irrigation line; and a tool having a passage therethrough with an opening in fluid communication with the passage. The tool may be receivable in the bore for puncturing the irrigation line. In a preferred form, the saddle tee assembly also includes an anti-rotation interface between the collar portion and the tool. The anti-rotation interface includes a first stop on the collar portion and corresponding second stops on the tool. The first and second stops being engageable to align a received tool in a predetermined orientation and restrict unintentional rotation of the tool.

14 Claims, 3 Drawing Sheets

U.S. PATENT DOCUMENTS

| | | |
|---|---|---|
| 4,611,624 A | 9/1986 | Snyder |
| 4,626,142 A | 12/1986 | Brin et al. |
| 4,655,480 A | 4/1987 | Thalmann |
| 4,708,373 A | 11/1987 | Morriss, Jr. |
| 4,719,936 A | 1/1988 | Tsubakimoto et al. |
| 4,730,636 A | 3/1988 | Volgstadt et al. |
| 4,789,189 A | 12/1988 | Robertson |
| 4,809,735 A | 3/1989 | Volgstadt et al. |
| 4,956,916 A | 9/1990 | Robertson |
| 4,966,397 A | 10/1990 | McKinnon |
| 5,020,832 A | 6/1991 | Coblentz |
| 5,040,828 A | 8/1991 | Kane |
| 5,066,053 A | 11/1991 | Miller |
| 5,076,318 A | 12/1991 | Fedora |
| 5,095,564 A | 3/1992 | Kruger |
| 5,105,844 A | 4/1992 | King, Sr. |
| 5,169,177 A | 12/1992 | McLennan et al. |
| 5,241,981 A | 9/1993 | Ahern |
| 5,286,070 A | 2/1994 | Williams |
| 5,360,241 A | 11/1994 | Gundy |
| 5,425,395 A | 6/1995 | Brennan |
| 5,553,898 A | 9/1996 | Rogers, Jr. |
| 5,659,935 A | 8/1997 | Lo-Pinto et al. |
| 5,694,971 A | 12/1997 | Wilcock |
| 5,694,972 A | 12/1997 | King |
| 5,732,732 A | 3/1998 | Gross et al. |
| 5,829,474 A | 11/1998 | Bolender |
| 5,893,686 A | 4/1999 | Weiler |
| 5,964,240 A | 10/1999 | Granovski |
| 6,012,475 A | 1/2000 | Taylor et al. |
| 6,216,723 B1 | 4/2001 | King |
| 6,357,472 B1 | 3/2002 | King |
| 6,412,824 B2 | 7/2002 | Kunsman |
| 6,454,312 B1 | 9/2002 | Désorcy et al. |
| 6,510,865 B2 | 1/2003 | King, Jr. et al. |
| 6,601,605 B2 | 8/2003 | King, Jr. |
| 6,612,330 B1 | 9/2003 | Robison et al. |
| 6,640,827 B1 | 11/2003 | McClure |
| 6,648,377 B2 | 11/2003 | Marandi |
| 6,648,562 B1 | 11/2003 | Calkins et al. |
| 6,681,796 B2 | 1/2004 | King, Jr. |
| 6,758,237 B2 | 7/2004 | Sichler et al. |
| 6,767,033 B2 | 7/2004 | King, Jr. et al. |
| 6,773,036 B1 | 8/2004 | King |
| 6,907,896 B1 | 6/2005 | Christodoulou et al. |
| 6,986,532 B1 | 1/2006 | King |
| 7,021,328 B2 | 4/2006 | Robison et al. |
| 7,150,289 B2 * | 12/2006 | Mortensen .................. 137/318 |
| 2004/0113425 A1 | 6/2004 | King |
| 2005/0034762 A1 | 2/2005 | Maier et al. |
| 2006/0027266 A1 | 2/2006 | Kim et al. |
| 2006/0065306 A1 | 3/2006 | Mortensen |

* cited by examiner

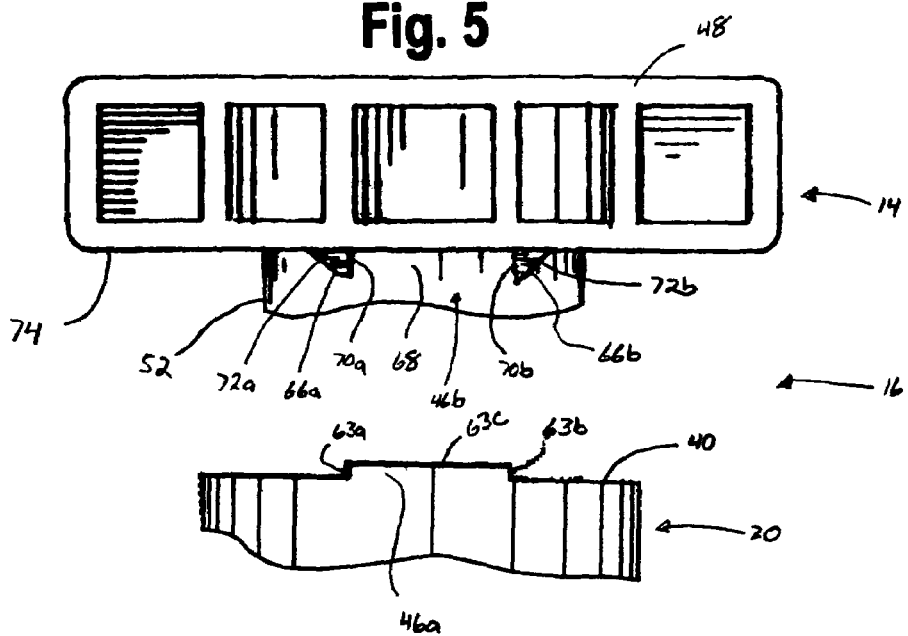
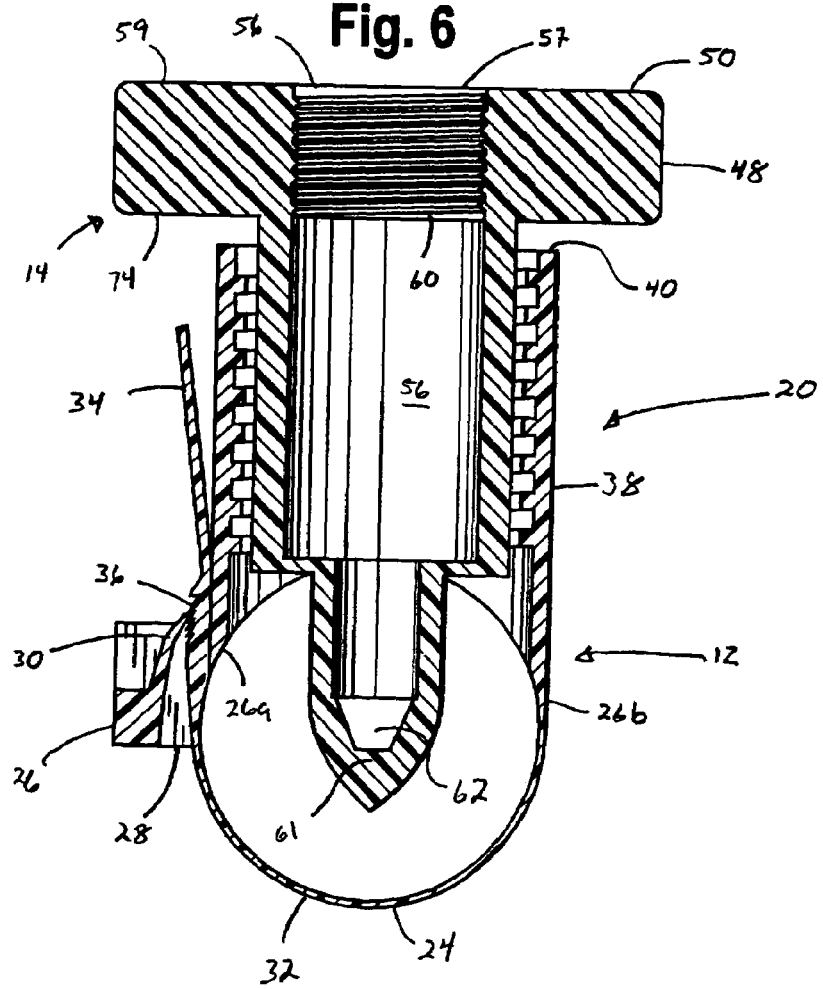

SADDLE TEE AND TOOL FOR IRRIGATION LINES

FIELD OF THE INVENTION

The invention is directed to a connector for use with an irrigation line and, in particular, to a saddle tee and tool combination for connection to an irrigation line.

BACKGROUND OF THE INVENTION

Several types of connectors are used to make fluid connections within irrigation lines, such as the fluid connection between a branch line and a main line. One such connector known in the art is a saddle tee and tap combination. In this type of connection, the saddle tee is secured to the main line and the tap is inserted into the saddle tee to puncture the main line and to form a passage to the branch line.

In such connections, the tap often provides multiple functions. The tap may puncture the main line, form a passage from the main line to the branch line, and also form a connection to the branch line. As a result, the tap usually remains within the saddle tee in this type of connection. To accomplish such multiple functions, the tap may include a pointed shaft, a passage or bore within the tap, and a window or other opening near the pointed shaft. The pointed shaft is used to puncture the main line. The window or opening receives fluid from the main line and directs such fluid to the tap passage. And, the tap passage provides a fluid communication between the main line and the branch line.

To form such a connection, the tap is usually threaded into the saddle tee. The rotational forces used to thread the tap into the saddle tee translate into a sufficient downward force such that the shaft point punctures the main irrigation line after the tap is threaded a sufficient number of turns into the saddle tee. After puncturing, the tap is usually threaded further into the saddle such that the window or other opening is located within a cross-section of the main line. In an optimal configuration, the tap is threaded to such a point that the window is approximately centrally located within the cross section of the main line and oriented down a longitudinal axis of the main line. Such orientation allows the most efficient flow of fluid between the main line and the branch line.

However, it is often difficult to achieve such optimal configuration using existing saddle tee and tap combinations. For instance, during installation, it is difficult to determine the number of turns that orients the tap in the optimal orientation, and even if such orientation is obtained, the tap may deviate from such configuration over time. For example, the tap may rotate either clockwise or counter-clockwise after being installed such that the window is no longer in the optimal configuration. In this undesired orientation, the tap has rotated such that the window is skewed toward the direction of fluid flow or, if sufficient rotation occurs, orthogonal to the fluid flow. In these undesired orientations, it is more difficult for the fluid to flow from the main line to the branch line.

Previous attempts at holding a tap in a saddle tee in the optimal configuration are deficient for several reasons. In some assemblies, an angled notch is provided in the saddle tee to engage a tab on the tap, but these designs only secure the tap in a single direction. As a result, the tap may still deviate from the optimal orientation in an opposite direction. Other designs use a pair of tabs or other protrusions on the saddle tee collar that each engages a curved wing or curved lob of a handle of the tap. In this design, there is play in the relationship between the tabs on the saddle tee and the handle because the curved surface on the handle allows some rotational movement of the tap. Therefore, such play allows the tap to deviate in either direction from the optimal orientation over time. U.S. Pat. Nos. 5,105,844; 5,694,972; and 6,510,865 are examples of such saddle tee and tap combinations.

As a result, it is desired to provide a saddle tee and tap combination that holds the orientation of the tap at a predetermined configuration or direction.

BRIEF DESCRIPTION OF THE DRAWINGS

FIG. 5 is an exploded, partial side elevational view of the saddle tee and tool of FIG. 4; and FIG. 6 is a cross-sectional view of the saddle tee and tool of FIG. 4.

DESCRIPTION OF THE PREFERRED EMBODIMENTS

Referring to FIGS. 1-6, an exemplary assembly 10 for forming a connection to an irrigation line 11 is shown. The assembly 10 includes a saddle tee 12 and a tool 14 that is threadably receivable in the saddle tee 12. The saddle tee 12 is secureable to the irrigation line 11 and, together with the tool 14, forms a fluid connection to a second irrigation line (not shown). In one embodiment, the assembly 10 also includes an anti-rotation interface 16 (FIGS. 3-5) that holds the tool 14 in a preferred and predetermined direction, orientation, or configuration within the saddle tee 12. That is, the anti-rotation interface 16 holds the tool 14 in such preferred configuration so that a fluid efficiently flows from the irrigation line 11 to the joined second irrigation line.

Figure 1:
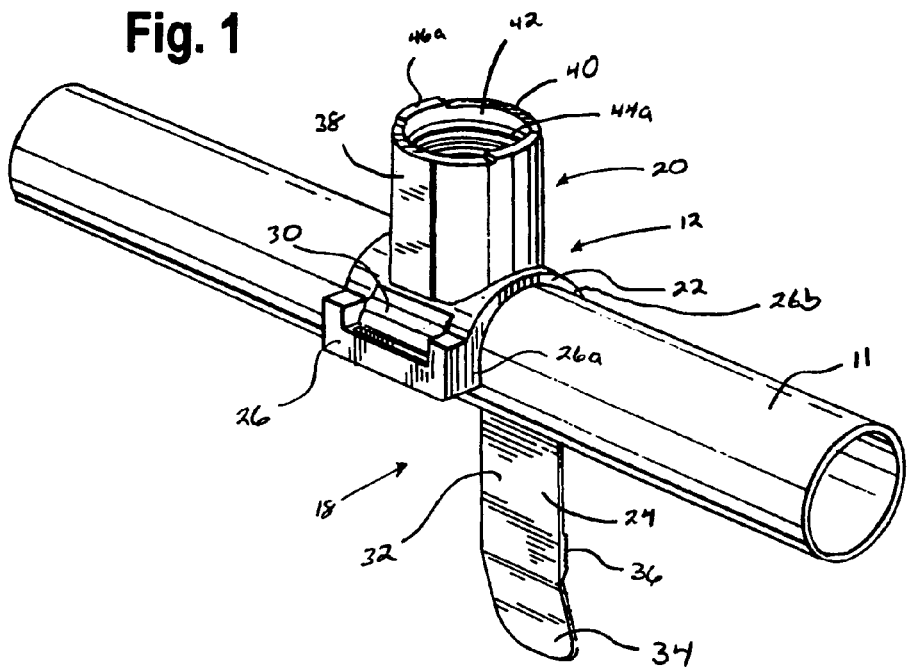
FIG. 1 is a perspective view of an exemplary saddle tee, shown unsecured to an irrigation line and without a tool for puncturing an irrigation line.
Figure 2:
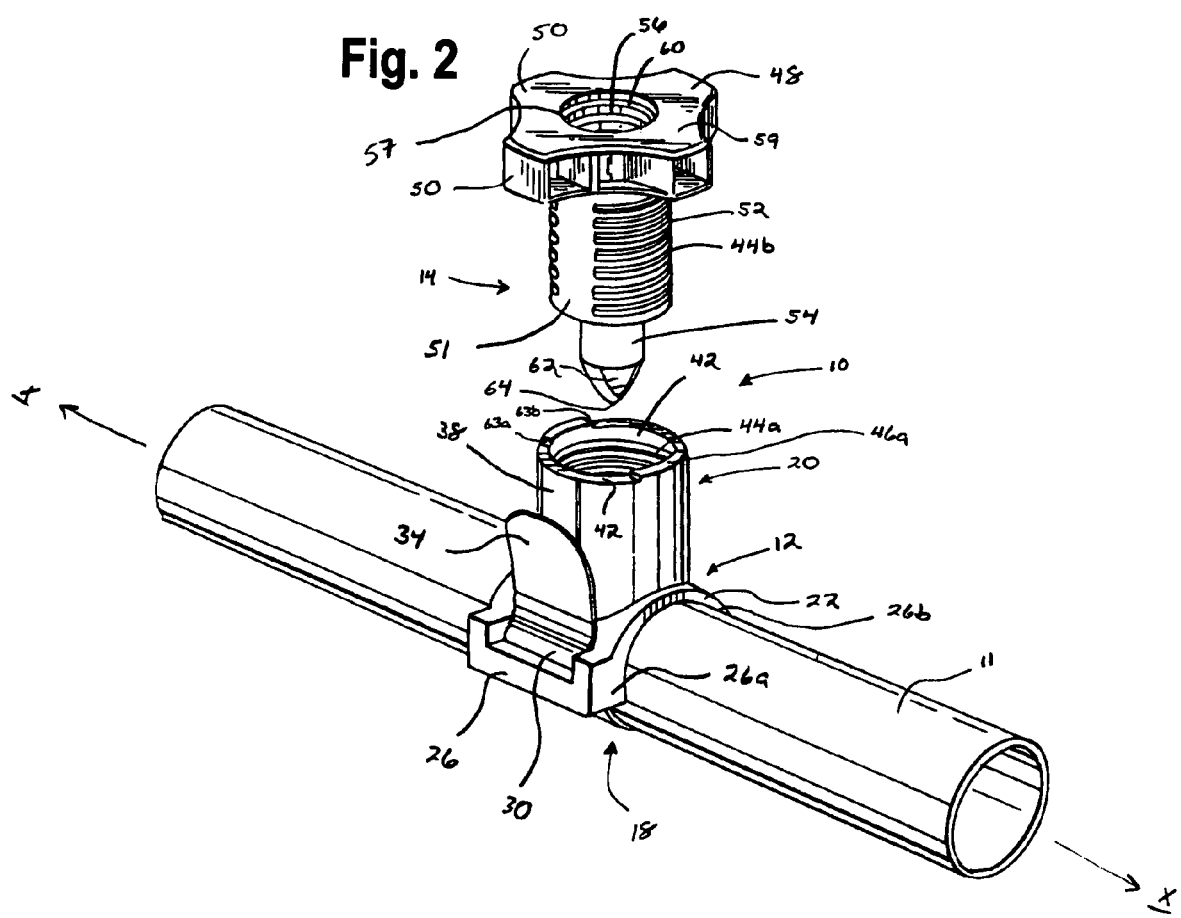
FIG. 2 is a perspective view of the saddle tee of FIG. 1, shown secured to an irrigation line, and an exemplary tool for puncturing an irrigation line.

As best shown in FIGS. 1 and 2, the preferred saddle tee 12, which may be nylon, includes a securing portion 18 and a collar portion 20. The securing portion 18 is for holding or securing the saddle tee 12 to the irrigation line 11. In a preferred form, the securing portion 18 includes a saddle portion 22 and a strap portion 24 that combine to hold the saddle tee 12 to the irrigation line 11.

The saddle portion 22 aligns the saddle tee 12 with the irrigation line 11. For example, the saddle portion 22 generally forms the upper half of the securing portion 18 and has a curvature that conforms to a curvature of the irrigation line 11 so that the saddle portion 22 may be superimposed on the irrigation line 11 as shown in FIG. 1. The saddle portion 22 may also include a lock portion 26 on one side of the saddle 26a, and a strap portion 24 extending from the other side of the saddle 26b. In the illustrated embodiment, the lock portion 26 defines an opening 28, best illustrated in FIG. 6, for receiving the strap portion 24 and a lock finger 30 for holding or securing the strap portion 24 within the lock portion 26; however, other structures or locking devices known in the art may also be used to secure the strap portion 24 to the saddle portion 22.

The strap portion 24 holds or secures the saddle tee 12 to the irrigation line 11. The strap portion 24 generally forms the lower half of the securing portion 18. In the illustrated embodiment, the strap portion 24 includes a flexible belt 32 that is bendable around the irrigation line 11. The belt 32 may also terminate in a locking tab 34 and include at least one locking tooth or, preferably, a set of looking teeth 36, which are disposed on a distal end of the belt 32 adjacent the locking tab 34, that are engageable with the locking finger 30 of the lock portion 26.

With the above described securing portion 18, the saddle tee 12 is secured to the irrigation line by wrapping the belt 32 around a lower portion of the irrigation line 11 and locking the belt 32 in the locking portion 26. That is, the saddle portion 22 is first placed on the irrigation line 11 so that the curvatures of the saddle portion 22 and irrigation line 11 mate. Then, the belt 32 is wrapped around the opposite side of the irrigation line 11 and the tab 34 is then inserted into and pulled or pushed through the opening 28 such that the locking finger 30 interferes or engages one of the locking teeth 36 as best shown in FIGS. 2 and 6. The locking finger 30 and locking teeth 36 form a one-way lock. That is, as the tab 34 is pulled or pushed through the opening 28, the locking finger 30 deflects outwardly as the at least one locking tooth or set of locking teeth 36 pass by the finger 30. The engagement of the finger 30 and the teeth 36 lock the strap portion 24 in the lock portion 26 against being pulled out to secure or hold the saddle tee 12 in a tight-fit arrangement to the irrigation line 11.

Again referring to FIGS. 1 and 2, the collar portion 20 of the saddle tee 12 receives the tool 14 to form a fluid connection from the irrigation line 11 to the second irrigation line. In a preferred embodiment, the collar portion 20 generally includes an annular wall 38 that extends upwardly from the saddle portion 22. The annular wall 38 terminates with an upper edge 40 that defines an opening into a bore 42 defined by the annular wall 38. The opening and bore 42 are sized to receive the tool 14. Preferably, the bore 42 includes internal threads 44a that mate with external threads 44b on the tool 14. On the upper edge 40, there is a portion 46a of the anti-rotation interface 16. In one form, the portion 46a may be a single protrusion, a pair of protrusions, a tab, a boss, or the like that extends upwardly from the collar upper edge 40 to act as stops to limit rotation of the tool 14.

The assembly 10 also includes the tool 14. Referring to FIG. 2, the tool 14, which may be a tap, is configured for puncturing the irrigation line 11 and also for forming a fluid connection between the irrigation line 11 and the second irrigation line. The tool 14, which is preferably an ABS plastic, includes a handle 48 and a shaft 51. The handle 48, which may include various lobes or wings 50, provides a surface or structure so that a user may grasp and rotate the tool 14 with enhanced leverage and grip when threadably inserting the tool 14 in an installation direction into the saddle tee 12. Depending below the handle 48 is the shaft 51, which preferably includes a threaded portion 52 and a piercing portion 54. The threaded portion 52 generally has a larger diameter than the piercing portion 54 and is sized to be received in the bore 42. The threaded portion 52 includes the external threads 44b that mate with the internal threads 44a of the bore 42. On a distal end of the piercing portion 54 is a piercing point or sharp end portion 64, which pierces or punctures the irrigation line 11 when the tool is threadably rotated a predetermined number of rotations into the bore 42.

Figure 3:
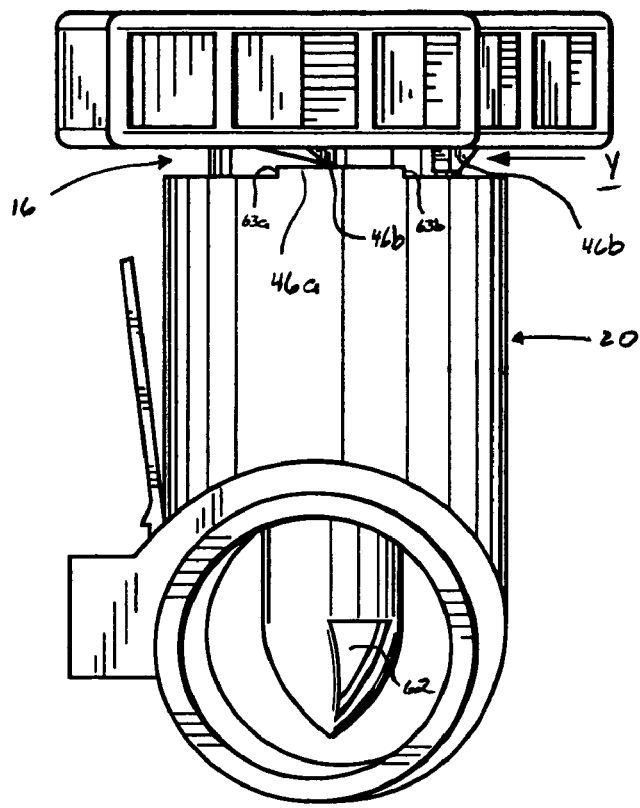
FIG. 3 is a side elevational view of the saddle tee and tool of FIG. 2, the tool is shown partially inserted into the saddle tee and in an undesired orientation.
Figure 4:
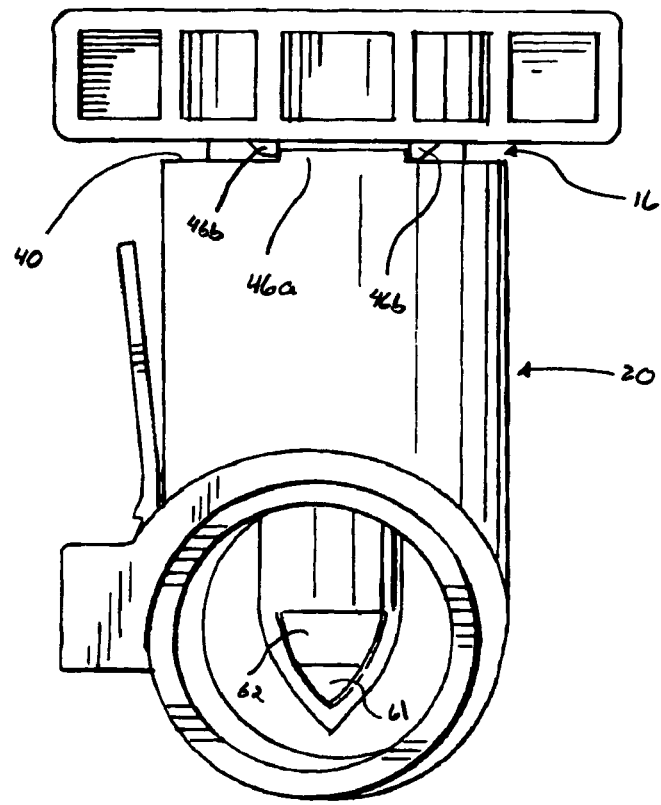
FIG. 4 is a side elevational view of the saddle tee and tool of FIG. 3, the tool is shown completely inserted into the saddle tee and in a preferred orientation.

Also depending below the handle 48 is a second portion 46b of the anti-rotation interface 16, which is described more fully below and is best illustrated in FIGS. 3-5.

As previously mentioned, the tool 14 also provides a fluid connection to the second irrigation line for the assembly 10. In that regard, the tool 14 defines a central passage 56 that allows a fluid to flow therethrough from the irrigation line 11 to the second irrigation line. For instance, as illustrated in one form in FIGS. 2 and 6, the passage 56 extends through the tool 14 from a first opening or window 62 in the piercing portion 54 upwardly through the tool 14 to a second opening 57 defined by the top surface 59 of the handle 48. The central passage 56 may also include internal threads 60, which are designed to threadably mate directly with a cooperatingly threaded end of the second irrigation line or with a coupling device, elbow, tee, or other known joining structure (not shown) that holds the second irrigation line to the assembly 10.

The window or other opening 62 is defined by the hollow conical piercing end portion 64. In a most preferred form, there are two windows diametrically disposed along the conical piercing end portion 64. The openings 62 are also in fluid communication or lead to the central passage 56. In one form, the central passage 56 may also include a partition 61 between the diametrically disposed two windows 62 in the conical piercing end portion 64. The partition 61 directs a fluid flow upwardly into the central passage 56 as the fluid passes through the upstream window or opening 62. In such configuration, a fluid from the irrigation line 11 may flow into the passage 56 from the opening 62 in the piercing portion 54 when the tool 14 is received in the saddle 12 and has punctured the line 11.

Referring to FIGS. 3-5, the anti-rotation interface 16 between the saddle tee 12 and the tool 14 will now be described. As previously mentioned, a first portion 46a of the anti-rotation interface 16 is on the saddle tee 12, and second portions 46b of the interface 16 is on the tool 14. The interface 16 holds the tool 14 in the preferred and predetermined rotational orientation such that fluid flow is optimized in the assembly between the irrigation line 11 and the second irrigation line. That is, the anti-rotation interface 16 holds the tool 14 threadably received in the bore 42 of the saddle tee 12 such that the openings or windows 62 are aligned with the direction of the fluid flow in the irrigation line 11. In other words, the irrigation line 11 has a longitudinal axis X, which is in the direction of fluid flow, and the preferred, predetermined rotational orientation has the openings or windows 62 aligned generally coaxial with the axis X.

To orient and hold the tool 14 in the preferred configuration, the tool 14 is threadably received in the bore 42 of the saddle tee collar 20 a predetermined number of rotations until the first portion 46a and the second portions 46b of the anti-rotation interface 16 engage each other or interfere with each other. For example, as shown in FIG. 3, the tool 14 is in an undesired rotational orientation. In this condition, the tool 14 is only partially threaded into the bore 42 such that the windows or openings 62 are misaligned with the longitudinal axis X of the irrigation line 11.

To place the tool 14 in the preferred rotational orientation, the tool 14 is further rotated in the direction of arrow Y. FIG. 4 illustrates the tool 14 in the preferred rotational orientation. In this orientation, the tool 14 is completely threaded into the bore 42 such that the first portion 46a of the anti-rotation interface 16 and the second portions 46b of the anti-rotation interface 16 are engaged or interfering with each other. In this condition, the anti-rotation interface 16 preferably holds the tool 14 in such preferred orientation and/or restricts the tool 14 from rotating, and the windows or openings 62 are aligned generally coaxial with the longitudinal axis X.

More specifically, the preferred anti-rotation interface 16 includes the first portion or a first stop 46a on the saddle tee 12 and the second portions or second stops 46b on the tool 14. As described above, the interaction or interference of the stops 46a and 46b holds or secures the tool 14 in the predetermined and preferred orientation. In that regard, the stops 46a and 46b preferably each have a pair of stop surfaces that engage each other such that the tool 14 is restricted from being unintentionally rotated either clockwise or counterclockwise. Because the tool 14 is preferably being restricted against rotation, the windows or openings 62 are generally aligned in the preferred orientation.

In one form, the first stop 46a is preferably disposed on the upper edge 40 of the collar portion 20 and includes at least two oppositely facing stop surfaces 63a and 63b. The preferred stop surfaces 63a and 63b are perpendicular to the upper edge 40 and face in opposite rotational directions on the upper edge 40.

The second stops 46b, on the other hand, are preferably a pair of spaced stops or fingers 66a and 66b that depend from a bottom surface 74 of the tool handle 48 along an outer circumference of the threaded portion 52. Therefore, the second stops 46b do not rely on the lobes or wings 50 or other curved surface of the tool handle 48. The spaced fingers 66a and 66b further define a capture space 68, which is sized to receive and hold the first stop 46a therein with a generally close-fit arrangement so that the tool 14 is restricted from rotating unintentionally in either the clockwise or counter clockwise direction. The spaced fingers 66a and 66b each have a corresponding stop surface 70a and 70b that is generally perpendicular to the bottom surface 74 of the tool handle 48 and a ramp surface 72a and 72b, respectively. As opposed to the stop surfaces 63a and 63b on the first stop 46a, the stop surfaces 70a and 70b on the second stops 46b are facing each other and define the boundaries of the capture space 68, which is sized to correspond to a length of the first stop 46a.

The finger 66a preferably has a different profile than the finger 66b. For instance, as the tool 14 is being threaded into the bore 42, the finger 66a has a profile such that the finger 66a clears a portion of the first stop 46a prior to engaging the first stop 46a. That is, the finger 66a preferably clears the stop surface 63b and a portion of a top surface 63c of the first stop 46a and then, as the finger 66a approaches the opposing stop surface 63a, the finger 66a begins to engage the top surface 63c until it snaps over the upper edge of the stop surface 63a. Indeed, the snap may be felt and/or heard during installation. In that regard, the finger 66a has the ramp 72a that may be longer and having a smaller angle of incline than the ramp 72b of the finger 66b. The angle of incline of the ramp surfaces 72a or 72b is with reference to extending downwardly and away from the handle bottom surface 74.

The overall size of the finger 66a is also selected such that the finger 66a is timed to engage and cam over the stop surface 63a just prior to the first stop 46a being captured in the capture space 68. In addition, because the finger 66a has a smaller angle of incline and longer ramp 72a, the finger 66a also has a smaller or shorter stop surface 70a than finger 66b. Therefore, if necessary, the tool 14 can be intentionally rotated in a counterclockwise direction when it is desired to remove the tool 14 from the saddle tee 12. Indeed, the smaller stop surface 70a of the finger 66a allows the tool 14 to be intentionally rotated counterclockwise back over the stop surface 63a.

On the other hand, the finger 66b has a profile that provides a hard stop against the stop surface 63b of the first stop 46a. That is, the stop surface 70b of the finger 66b prevents further intentional clockwise rotation of the tool 14. Once the stop surface 70b of the finger 66b engages the stop surface 63b of the first stop 46a, the tool is prevented from being rotated further into the bore 42. As such, the tool 14 is held in the preferred rotational orientation. In this regard, the finger 66b has a profile that preferably includes a larger angle of incline to form a larger or longer stop surface 70b.

Once the first stop 46a is captured in the capture space 68, the first stop 46a and the second stop 46b engage each other to preferably hold the tool 14 in the preferred rotational orientation, as described above, and also restrict the tool 14 from further unintentional rotation in, most preferably, both the clockwise and counter clockwise direction. More specifically, the stop surfaces 63a and 70a engage each other to restrict the tool 14 from being rotated unintentionally in a counterclockwise direction, and the stop surfaces 63b and 70b engage each other to restrict the tool 14 from being rotated either unintentionally or intentionally in a clockwise direction.

It will be understood that various changes in the details, materials, and arrangements of parts and components, which have been herein described and illustrated in order to explain the nature of the invention may be made by those skilled in the art within the principle and scope of the invention as expressed in the appended claims.

What is claimed is:

1. A tee connection apparatus for use with an irrigation line comprising:
   a collar defining a bore therethrough;
   a strap portion for securing the collar to an irrigation line;
   a tool having a passage therethrough and being threadably receivable in the bore for puncturing an irrigation line; and
   an anti-rotation interface between the collar and the tool comprising a first stop on the collar portion and a corresponding second stop on the tool, the first and second stops being engageable in an installation direction such that the tool has a predetermined orientation in the bore.

2. The tee connection apparatus of claim 1, wherein the tool defines at least one opening communicating with the passage and the opening being insertable into an irrigation line.

3. The tee connection apparatus of claim 2 wherein an irrigation line has a longitudinal axis and the at least one opening being aligned to open substantially along the axis.

4. The tee connection apparatus of claim 3, wherein the tool defines at least two openings being aligned to open substantially along the axis and having a partition at least partially therebetween for directing a fluid into the passage.

5. The tee connection apparatus of claim 3, wherein the tool includes a third stop spaced from the second stop and the second stop and the third stop being engageable with opposite sides of the first stop to restrict unintentional rotation of the tool in either direction.

6. The tee connection apparatus of claim 5, wherein the second stop is larger than the third stop.

7. The tee connection apparatus of claim 6, wherein the third stop is sized to clear a portion of the first stop prior to engaging the first stop.

8. The tee connection apparatus of claim 7, wherein the third stop includes a ramped surface and a stop surface and the ramped surface engageable with the first stop prior to the stop surface.

9. The tee connection apparatus of claim 8, wherein the third stop permits intentional rotation of the tool to remove the tool from the collar when desired.

10. The tee connection apparatus of claim 9, wherein the bore is at least partially internally threaded and the tool is at least partially externally threaded such that the bore is capable of threadingly receiving the tool.

11. The tee connection apparatus of claim 10, wherein the tool includes an enlarged handle to enhance the rotational torque applied when the tool is being threadingly turned into the bore.

12. The tee connection apparatus of claim 11, further comprising a lock capable of receiving an end portion of the strap portion and preventing removal of the strap end portion.

13. The tee connection apparatus of claim 12, wherein the lock includes at least one finger and the end portion of the strap portion includes at least one tooth and the at least one finger and the at least one tooth are engageable to prevent removal of the strap end portion.

14. The tee connection apparatus of claim 13, wherein the at least one tooth includes a plurality of teeth.

* * * * *